United States Patent Office 2,905,669
Patented Sept. 22, 1959

2,905,669

VINYLATION OF OXAZINIDINONES

William W. Bakke, Midland, Mich., assignor to The Dow Chemical Company, Midland, Mich., a corporation of Delaware No Drawing. Application April 14, 1958
Serial No. 728,093

6 Claims. (Cl. 260—244)

The present invention pertains to the organic chemical arts and has particular reference to a method for the direct vinylation of 2-oxazinidinone compounds of the general structure:

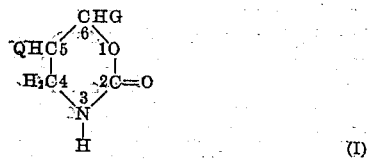
(I)

wherein Q is selected from the group consisting of hydrogen and methyl and G is selected from the group consisting of hydrogen, methyl, ethyl, propyl, butyl (i.e., alkyl radicals containing from 1 to about 4 carbon atoms, including corresponding monohaloalkyl radicals) and aryl radicals containing from 6 to about 10 carbon atoms (i.e., phenyl, alkyl substituted phenyl, etc.), in order to prepare monoethylenically unsaturated monomeric 2-oxazinidinone compounds of the formula:

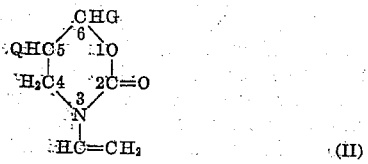
(II)

wherein G and Q have the above-indicated values.

It has been reported in the literature and indicated in the art that cyclic carbamate rings are not susceptible of being directly vinylated with acetylene. Thus, the Journal of Organic Chemistry, 22, 849 (1957) and German patent application B340321 Vb/12p (Klasse 12p Gruppe 3), filed 1–8/55—published 3–29/56, point out that the 2-oxazolidinone ring cannot be vinylated in this way.

It would be great advantage, and it is the principal object of the present invention, to provide a direct method for the vinylation of 2-oxazinidinone compounds of the Formula I in order to obtain such desirable and utile monomeric products as N-vinyl-5-methyl-2-oxazinidinone, N-vinyl-6-methyl-2-oxazinidinone, N-vinyl-6-ethyl-2-oxazinidinone, N-vinyl-6-phenyl-2-oxazinidinone, and other of the N-vinyl-2-oxazinidinone monomers of the Formula II. The various indicated N-vinyl-2-oxazinidinone monomers and certain of their derivatives, particularly polymeric and resinous products, have great utility and provide for many advantages and benefits in numerous applications. Such monomers are generally liquids although certain species, such as N-vinyl-6-phenyl-2-oxazinidinone and the like, are normally solid substances. The monomers and their polymeric derivatives constitute valuable intermediates and agents for dyestuffs, textile assistants, plastics, as dye-receptors, and so forth.

In accordance with the present invention, N-vinyl-2-oxazinidinone monomers of the Formula II may advantageously be prepared by a direct method which comprises mixing a 2-oxazinidinone starting compounds of the Formula I with a suitable catalyst or catalyst-forming material, such as an alkali metal hydroxide or alcoholate or the elemental metal itself to form a salt of the 2-oxazinidinone, then subjecting the catalyzed mixture to the action of acetylene under a pressure between about 1 atmosphere and the decomposition pressure of the acetylene at the temperature of the reaction (generally about 60 atmospheres), more advantageously between about 7 and 40 atmospheres, at a temperature between about 90 and 200° C., more advantageously between about 120 and 160° C., until at least a portion of the starting material is converted to the desired monomeric product. While the use of higher acetylene pressures tends to favor the progress of the reaction, care should be taken to operate safely with regard to the explosive nature of the gas. Ordinarily, the use of too low a temperature hinders or precludes the reaction while too high a temperature causes decomposition of the reactants to occur.

Ordinarily, satisfactory conversions and yields of desired product from the converted starting materials can be realized according to the method of the invention within reaction periods of 24 hours or less, frequently within 8 hours. The desired monomeric N-vinyl-2-oxazinidinone products can be recovered easily from the reaction mass using suitable known techniques, such as fractional distillation (advantageously under reduced pressure), by extraction with suitable solvents effective upon either the particular monomeric product involved or upon the undesired materials intended to be removed, recrystallization, precipitation, and so forth.

Among suitable catalysts there may be mentioned the hydroxides or alcoholates from lower alkyl alcohols of lithium, sodium, potassium, rubidium, etc., as well as the N-alkali metal salts of said starting 2-oxazinidinones which may be obtained readily by reacting the elemental alkali metal of atomic number from 3 to 55 with liquid or molten starting material, or by causing a solution or suspension of the starting materials to react with alkali metal alcoholates (which, advantageously, are of alkyl alcohols of from 1 to about 4 carbon atoms, i.e., the lower alkyl alcohols). The use of the elemental alkali metals to form salts with the starting 2-oxazinidinones is generally a highly advantageous technique in the practice of the invention. The concentration of catalyst useful in the practice of the invention is from about 0.5 to 50 mole percent, advantageously from about 3 to 10 mole percent, of the metal or metal compound used or the metal salt formed therewith, based on the molar quantity of the starting 2-oxazinidinone being converted. The catalysts may also be used in admixture with organic bases (for example, pyridine) or such substances as the monovalent forms of copper, silver and gold, including (but not limited to) such salts as cuprous oxide, cuprous halides, silver acetate, silver nitrate, and so forth. In addition to salts of 2-oxazinidinones, good results may also be obtained when there is employed as the catalyst an analogous alkali metal salt of a 2-oxazolidinone compound of the formula:

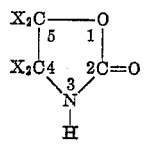

wherein each X is independently hydrogen or a lower alkyl radical of from 1 to 4 carbon atoms, such as the sodium salts of 2-oxazolidinone, 5-methyl-2-oxazolidinone, 4-methyl-2-oxazolidinone, 5-ethyl-2-oxazolidinone, etc.

The reaction with acetylene is preferably conducted in a pressure tight vessel. Advantageously, the acetylene may be used in admixture with an inert gas, such as nitrogen. When the starting 2-oxazinidinone material is normally liquid or easily molten substance it is generally unnecessary to employ any diluent or solvent vehicle in the reaction mass. If desired, however, such vehicles may be utilized. Suitable solvents for such purpose include the various aliphatic and aromatic hydrocarbons and ethers as typified by Skelly solvent, benzene, toluene, dioxane, diethyl ether, vinyl and alkyl vinyl ethers, dimethyl formamide and the like. One of the desirable features of using a solvent is to permit dilution of the acetylene in the reaction mixture in the solvent vapors.

The invention is further illustrated in and by the following illustrative example wherein, unless otherwise indicated, all parts and percentages are to be taken on a weight basis.

*Example 1*

Into a 300 milliliter stainless steel autoclave there was charged about 93 grams of 2-oxazinidinone, 6.15 grams of the sodium salt of 5-methyl-2-oxazolidinone, and 50 grams of dry benzene. The reaction mixture was then saturated therein with acetylene under 200 p.s.i. pressure at room temperature. While maintaining the reaction mass pressed under acetylene, it was heated to about 150° C. and held at this temperature for 3 hours. During the reaction, the pressure in the autoclave at reaction temperature dropped from about 450 to 325 p.s.i. After the termination of this period, the reaction mixture in the still sealed autoclave was permitted to cool to room temperature. At the end of the cooling period, the autoclave was vented and its contents removed. Distillation of the reaction mass gave 6 grams of monomeric N-vinyl-2-oxazinidinone boiling under 2.2 mm. Hg pressure at 115° C. The recovered monomer had a refractive index ($n_D^{25}$) of about 1.4972 as distinguished from N-vinyl-5-methyl-2-oxazolidinone which boils under 2 mm. Hg at 86° C. and has a refractive index of 1.4820. Iodine titration of the monomeric N-vinyl-2-oxazinidinone indicated it to be at least 86 percent pure.

At least commensurate results are obtained when the foregoing is duplicated excepting to employ as the catalyst the sodium salt of 2-oxazinidinone, or when an elemental alkali metal such as sodium or potassium, or a hydroxide, methoxide or ethoxide of such metals is charged with the reaction mass as the catalyst.

Results analogous to those demonstrated are also achieved when the foregoing is repeated to product other of the vinyl monomers of the Formula II contemplated as being manufacturable by practice of the present invention using any of the catalysts and reaction conditions within its scope.

What is claimed is:

1. Method which comprises mixing (1) a 2-oxazinidinone starting compound of the structural formula:

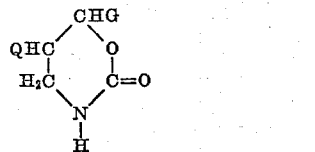

(I)

wherein Q is selected from the group consisting of hydrogen and methyl and G is selected from the group consisting of hydrogen, alkyl radicals that contain from 1 to about 4 carbon atoms and aryl hydrocarbon radicals that contain from 6 to about 10 carbon atoms with between about 0.5 and 50 mole percent, based on the molar quantity of the starting 2-oxazinidinone compound of the Formula I, of (2) a catalyst compound selected from the group consisting of alkali metals of atomic number from 3 to 55, hydroxides of said alkali metals, alcoholates from 1 to 4 carbon atom alkyl alcohols of said alkali metals, salts of said alkali metals with said 2-oxazinidinone compounds of the Formula I, salts of said alkali metals with 2-oxazolidinone compounds of the structure:

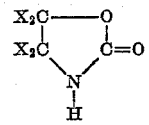

wherein each X is independently selected from the group consisting of hydrogen and 1 to 4 carbon atom-containing alkyl radicals, and mixtures thereof; then subjecting said mixture to acetylene under a pressure between about 1 atmosphere and the decomposition pressure of acetylene at the temperature of reaction at a temperature between about 90 and 200° C. until at least a portion of said starting material is converted to an N-vinyl-2-oxazinidinone monomer product of the formula:

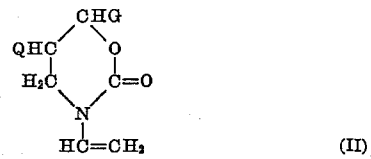

(II)

wherein Q and G are as in Formula I.

2. The method of claim 1, wherein said pressure is between about 7 and 40 atmospheres and said temperature is between about 120 and 160° C.

3. The method of claim 1, wherein between about 3 and 10 mole percent of said catalyst compound 1 is mixed with said starting 2-oxazinidinone compound 2 of the formula (I).

4. The method of claim 1, wherein the starting compound is 2-oxazinidinone and the monomer product is N-vinyl-2-oxazinidinone.

5. The method of claim 1, wherein the starting compound is 5-methyl-2-oxazinidinone and the monomer product is N-vinyl-5-methyl-2-oxazinidinone.

6. The method of claim 1, wherein the starting compound is 6-methyl-2-oxazinidinone and the monomer product is N-vinyl-6-methyl-2-oxazinidinone.

References Cited in the file of this patent

UNITED STATES PATENTS

| | | |
|---|---|---|
| 2,317,804 | Reppe et al. | Apr. 27, 1943 |
| 2,806,847 | Nedwick | Sept. 17, 1957 |
| 2,806,848 | Nedwick | Sept. 17, 1957 |
| 2,818,362 | Drechsel | Dec. 31, 1957 |